United States Patent [19]
Wolters

[11] Patent Number: 4,735,467
[45] Date of Patent: Apr. 5, 1988

[54] STOW AWAY FLAT SCREEN MECHANISM

[75] Inventor: Richard H. Wolters, Grand Rapids Township, Kent County, Mich.

[73] Assignee: Westinghouse Electric Corp., Pittsburgh, Pa.

[21] Appl. No.: 866,513

[22] Filed: May 23, 1986

[51] Int. Cl.<sup>4</sup> ............................................. A47B 81/00
[52] U.S. Cl. ...................................... 312/29; 312/21; 248/1 B
[58] Field of Search .................. 312/21, 29, 208, 251; 248/1 A, 1 C, 1 B

[56] References Cited

U.S. PATENT DOCUMENTS 4,438,458  3/1984  Munscher ........................... 312/251
4,562,482 12/1985  Brown ................................. 312/208
4,669,789  6/1987  Pemberton .......................... 312/208

FOREIGN PATENT DOCUMENTS

0614064 11/1933  Fed. Rep. of Germany ........ 312/28
2480581 10/1981  France ................................. 312/26

Primary Examiner—Kenneth J. Dorner
Assistant Examiner—Gerald A. Anderson
Attorney, Agent, or Firm—B. R. Studebaker

[57] ABSTRACT

A stow away video display terminal in combination with a computer work station or desk wherein the video display terminal is concealed within the desk beneath the work surface in a stored condition when not in use and raised to a viewable position above the work surface by means of a motor driven lift mechanism when it is needed.

9 Claims, 7 Drawing Sheets

STOW AWAY FLAT SCREEN MECHANISM

BACKGROUND OF THE INVENTION

This invention relates to computer work stations or desks and more particularly to the mounting of a visual display terminal in a concealed location when not in use which is automatically movable to a viewable position above the work surface when in use.

There has been a tremendous influx of small business computers into the office of today. The appearance of a work station has greatly changed over the past few years with the typical office or work station desk work surface being continuously covered by computer keyboards, visual display terminals, disc drives and printers which utilize most or all of the space available for other types of work. This, other than from an appearance standpoint, has not been critical with respect to a work station or desk at which the computer system is utilized for a substantial portion of the day. However, computers are now being used extensively by executives and managers on a casual but daily basis to quickly access important business information such as engineering data, marketing and sales information, production information as well as electronic mail. Typically, prior to this invention the executive's or manager's desk has taken on the appearance of a computer work station. Many executives and managers object to their work surface or desk continuously supporting these many and varied electronic devices when their needs to access the computer is both minimal and sporadic during a typical work day. Systems have been provided for storing computer keyboards beneath a work surface to be pulled out on an articulating type arm when in use but the large box-like video display terminal is always sitting in plan view on the operators desk. With the very recent introduction of flat screen VDT's (video display terminals) the VDT will take up less space on the work surface but the full size screen is still there, in effect staring the office worker in the face, on a continuing bases. Clearly, clearing this area of the work surface for the executive or manager is desirable.

SUMMARY OF THE INVENTION

Although the stow away flat screen mechanism of this invention has been disclosed in connection with a flat screen VDT it should be understood that the concepts of this invention will apply equally well to a conventional box-like VDT. The stow away visual display terminal of this invention is employed in combination with a work surface which includes means for supporting the work surface at a predetermined working level and lift means supporting the visual display terminal which is operable to move the visual display terminal from a stored position beneath the work surface to a usable position above the work surface. Preferably, the visual display terminal is a flat screen VDT and includes a cover overlying the top of the visual display terminal having a surface finish which is identical with the surface finish of the work surface. Preferably, the work surface has a cut-out portion therethrough and the upper surface of the visual display terminal fills the cut-out portion of the work surface when the visual display terminal is in its stored position. The lift means includes track means secured to the work surface support and carriage means which interconnect the track means and the visual display terminal for supporting the visual display terminal on the lift means. Drive means, in the form of an electric motor and chain drive, are associated with the carriage for moving the visual display terminal from its stored position to its visual position. In addition, extensible glide means interconnect the visual display terminal and the carriage means for providing relative movement therebetween and a motion doubling direct chain drive links the track support with the visual display terminal whereby for every increment of movement of the carriage means the visual display terminal will move two increments of movement. In order to control the position of the VDT in both its stored and visual positions the carriage means is provided with a magnetic limit switch which coacts with spaced magnetic means on the frame for limiting the range of travel of the carriage on the frame and hence the limits of travel of the visual display terminal from its stored position to its visual position and back.

BRIEF DESCRIPTION OF THE DRAWINGS

Many of the attended advantages of the present invention will become more readily apparent and better understood as the following detailed description is considered in connection with the accompany drawings, in which.

DESCRIPTION OF THE PREFERRED EMBODIMENT

Figure 1:
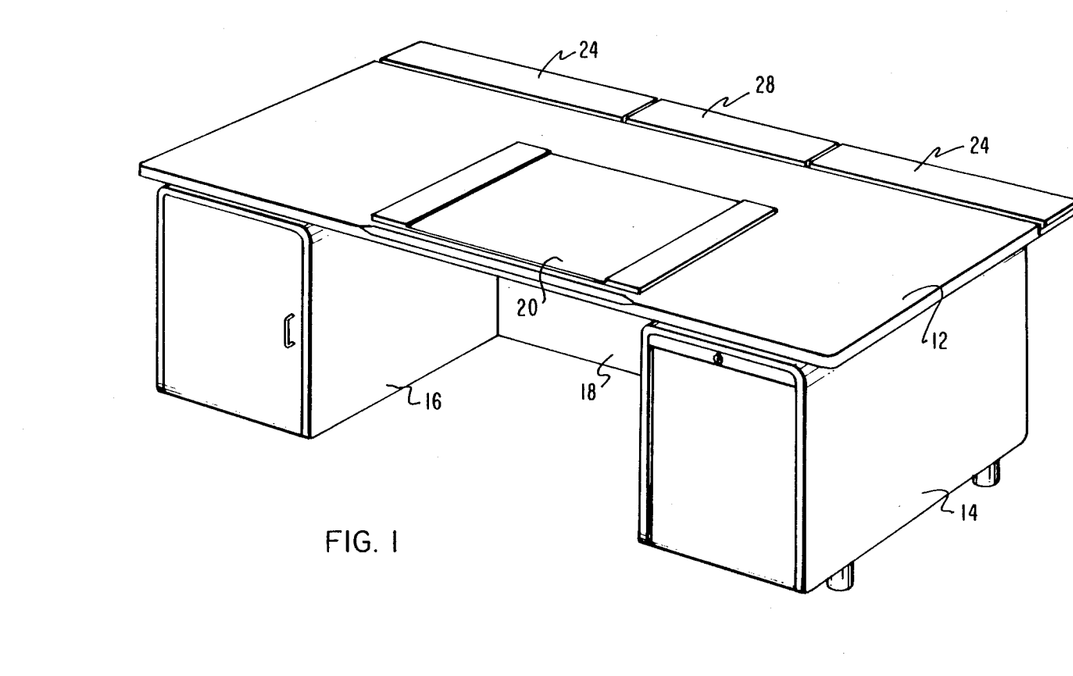
FIG. 1 is perspective view of a desk incorporating the stow away visual display terminal of this invention in its stored position.
Figure 2:
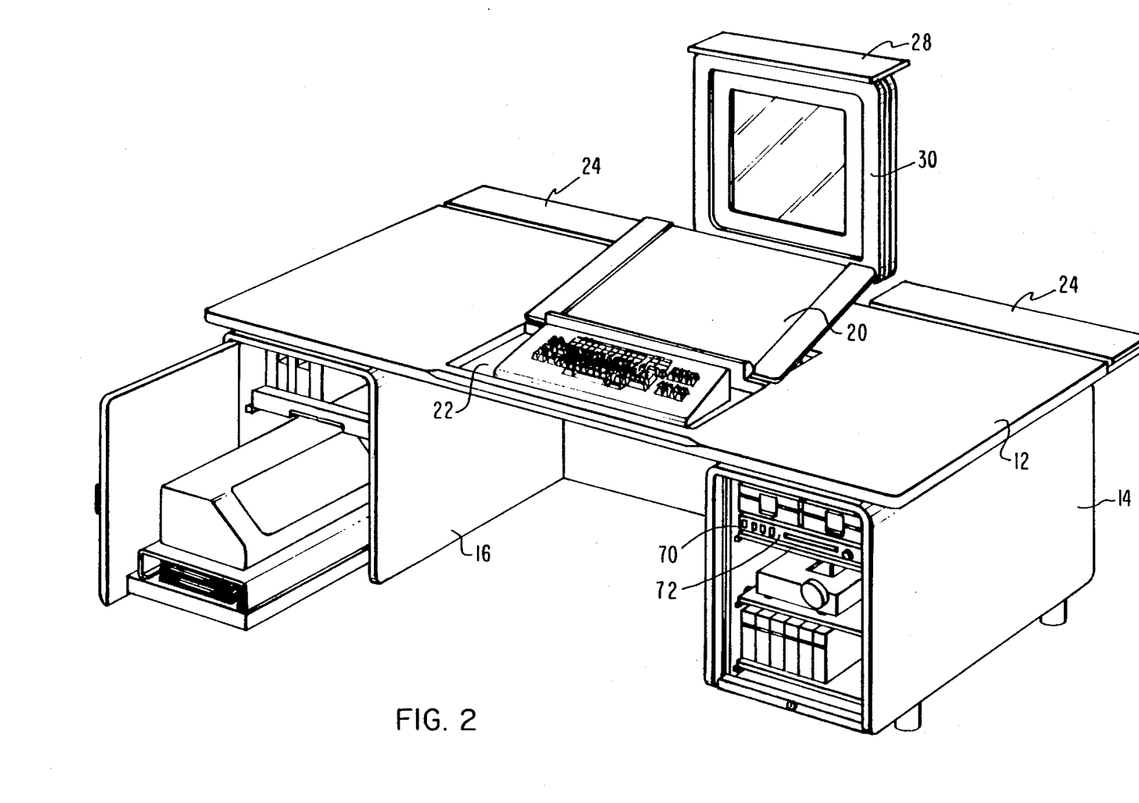
FIG. 2 is a perspective view similar to FIG. 1 with the stow away VDT of this invention in its use position.

Referring now in detail to the drawings wherein like reference characters represent like parts throughout the several views there is illustrated in FIGS. 1 and 2 the computer integrated desk disclosed in copending application Ser. No. 866,514 for Computer Integrated Desk, filed the same day as this application and owned by the assignee of this invention. FIGS. 1 and 2 are illustrative of one environment in which the stow away VDT of this invention can be employed. Although the invention has been illustrated in combination with a dual pedestal free standing desk it could be readily adapted to a wall hung desk for suspension from any of the many sapce dividing wall panel systems that are employed in the modern office. The conventional appearing computer integrated desk includes a planar work surface 12, a pair of work surface supporting storage pedestals 14 and 16 and a modesty panel 18 spanning the space between the pedestals at the rear of the desk. Centered over the knee space at the front of the work surface is a desk pad 20 which serves as a cover for the Pop-up Keyboard Support And Desk Pad Easel disclosed in copending application Ser. No. 866,430 filed the same day as this application and owned by the assignee of this invention. The keyboard support of that invention is illustrated at 22 in FIG. 2.

Figure 3:
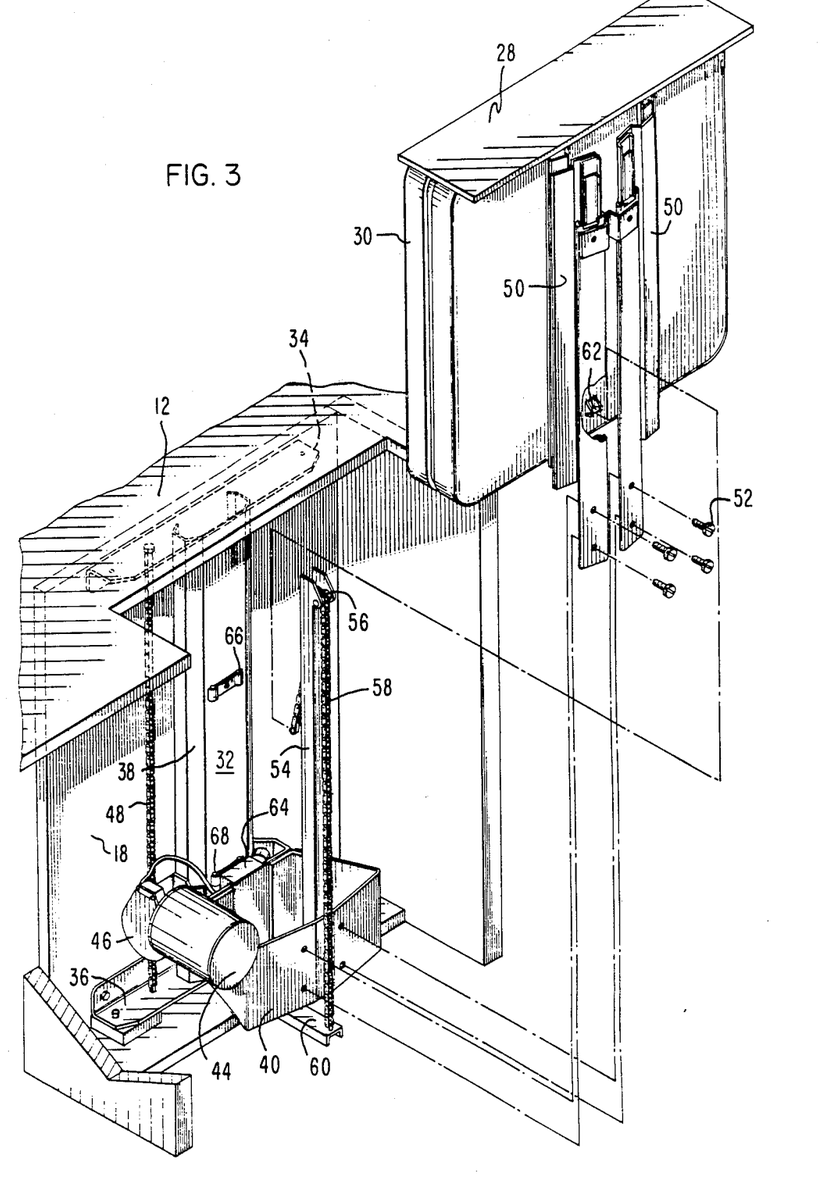
FIG. 3 is a exploded perspective view of the stow away VDT operating mechanism of this invention.

At the rear edge of the work surface 12 a pair of flipper door covered accessory containers 24 are illustrated. The flipper door covered accessory holders are conventional on many desks and under the covers 24 are usually container spaces for paper clips, rubber bands, note paper and the like. The central rearward portion of the work surface includes a matching VDT cover 28 which serves to cover the upper edge of a flat VDT and provide a finish which matches the adjacent accessory covers 24. Where accessory containers are not provided at the rear edge of the desk, the entire rear edge can have the same finish as the work surface whether that surface be wood, wood grain, or other high pressure laminate. FIG. 3 is illustrative of a work surface 12 where in the entire surface is of wood or high pressure laminate construction and the flat VDT's cover 28 is fabricated of a similar material and fills a cut-out portion of the work surface at the rear thereof.

Figure 4:
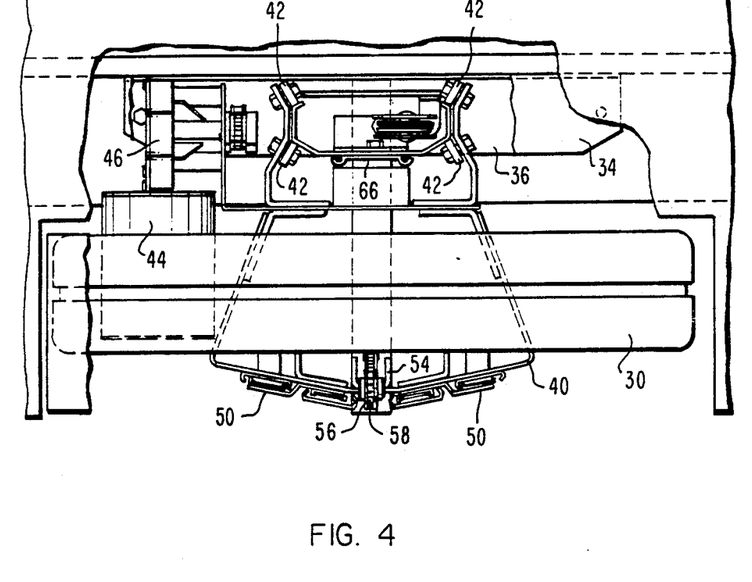
FIG. 4 is a top plan view with a portion of the work surface broken away.

The stow away video display terminal of this invention is disclosed in combination with a flat screen VDT 30 but it will be apparent that with minimal modifications the mechanism of this invention could be used in connection with a conventional box-like VDT which also includes a substantially planar screen portion. In accordance with the present invention a lift mechanism which is in part a conventional sewing machine lift mechanism marketed by Haefele Corporation of America, Highpoint, N.C., is employed. An I-shaped frame generally designated 32 is secured to the rear of the modesty panel 18 through flanges 34 and 36 with the central portion of the I-shaped frame forming a C-shaped track 38. A carriage member 40 is mounted, as best seen in FIG. 4, to the C-shaped track by four rollers 42. Mounted to the carriage 40 is an electric motor 44 which includes a gear drive 46 that operates on a chain 48 to impart vertical motion to the carriage 40.

The flat VDT screen 30 is mounted to the carriage 40 by means of a pair of conventional extensible drawer-type glides 50 which are mounted at one end to the carriage 40 by, for example, bolts 52 and at their other end, to the rear of the VDT screen by similar bolts or other conventional means. The use of the extensible drawer glide mechanisms permit the VDT screen to move relative to the carriage 40 in a manner which will be later described.

Since the travel distance to raise or lower the VDT screen is 20 to 25 inches, a mechanism to move the screen would have to be between 24 to 29 inches in overall length. Space of this magnitude is normally unavailable under work surfaces set at conventional heights of from 25 to 30 inches. Allowing for the need to hide such a mechanism behind modesty panels on free standing desk and the need for baseboard clearance on panel hung work surfaces, a worst case distance of about 19" to 20" is all that is normally available for such a mechanism. To accommodate these requirements, the sewing machine lift mechanism is modified by providing a travel magnifying mechanism which includes a vertically oriented idler support arm 54 which supports an idler wheel 56 at the upper end thereof. A drive chain 58 is secured at its lower end to the fixed arm 60 which extends from the bottom flange 36. The chain 58 extends from the fixed arm 60 upwardly over the idler wheel 56 then downwardly to a connection at the back of the VDT screen 30 at 62 to provide the motion multiplying aspect of the drive.

The carriage 40 is provided with a magnetic limit switch 64 adjacent the track 38 and small magnets 66 and 68 are provided on the adjacent side of the track 38 to control the extent of travel of the carriage 40 on the track 38. As will be apparent the travel distance of the carriage 40 can be easily adjusted by merely moving the travel limiting magnets 66 or 68 in either direction.

The flat screen VDT can be actuated by a switch 70 in the control panel 72 in one of the desk pedestals or may be mounted in any other convenient location as desired.

In operation, actuation of the switch 70 activates the 24 volt DC servo motor 44 which in turn drives the worm and pinion drive unit 46 to cause the entire carriage to move upwardly on the track 38 toward the upper magnets 66. Through operation of the motion multiplier chain 58, the flat screen VDT 30 will move vertically at twice the rate as that of the carriage 40 so that for every increment of vertical motion of the carriage 40 the screen will move two increments of motion until the magnetic limit switch 64 on the carriage reaches the upper set of magnets 66 and arrests the carriage movement. At this point the VDT screen 30 will be positioned for operational use in a preselected position above the work surface. When the need for the computer display terminal ends, depression of the control switch 70 will cause the video display terminal to return to its stored position with the cover 28 resuming its position as a portion of the upper surface of the work surface.

Figure 5:
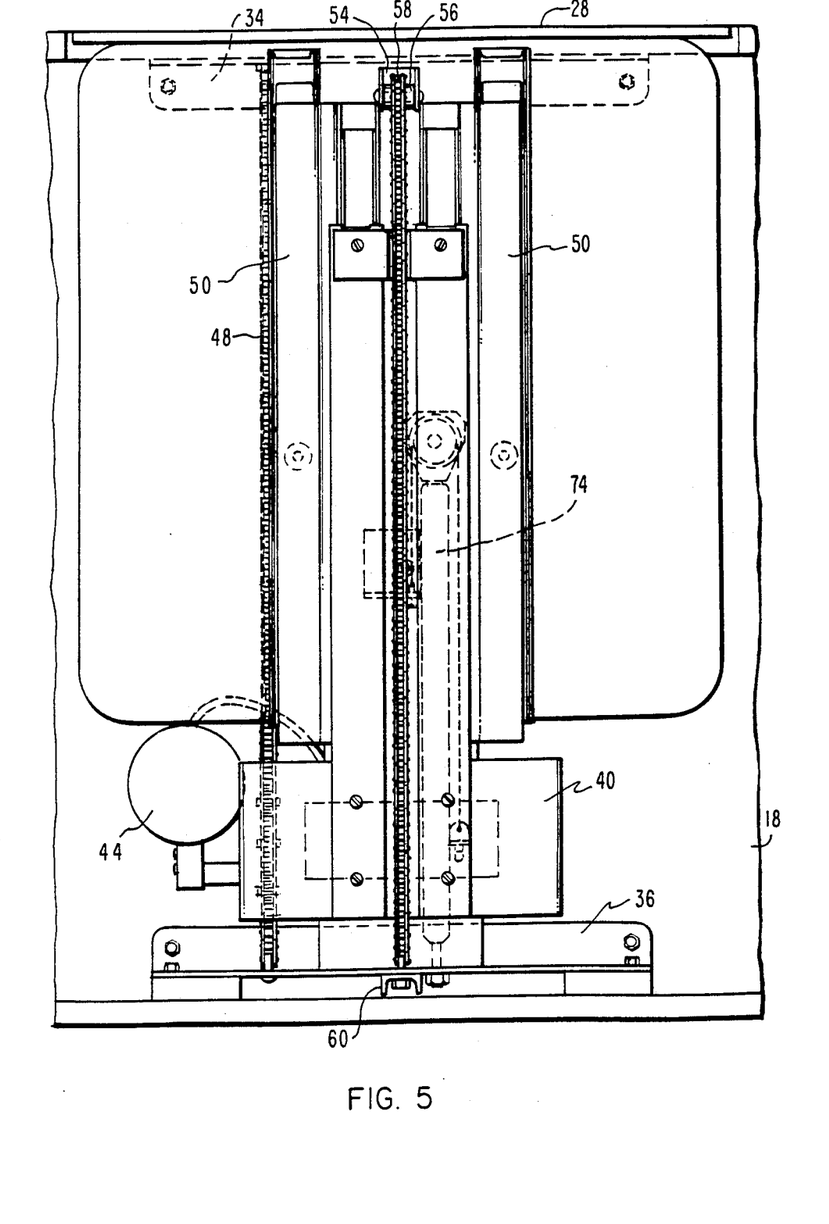
FIG. 5 is a rear elevation view.
Figure 6:
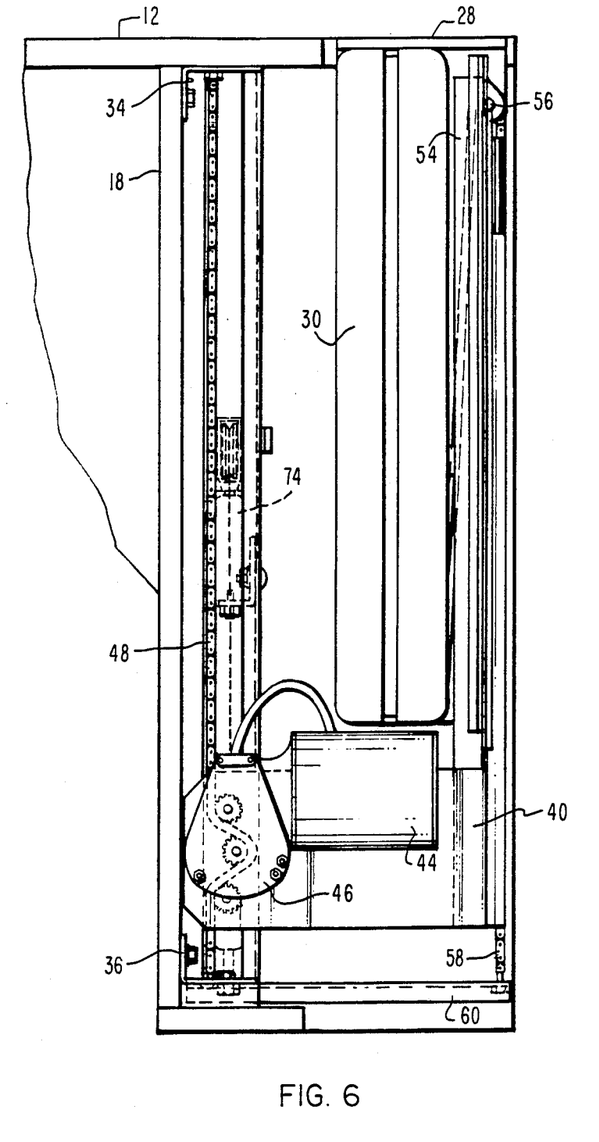
FIG. 6 is a side elevation view of the lift mechanism and flat VDT screen in its stored position.
Figure 7:
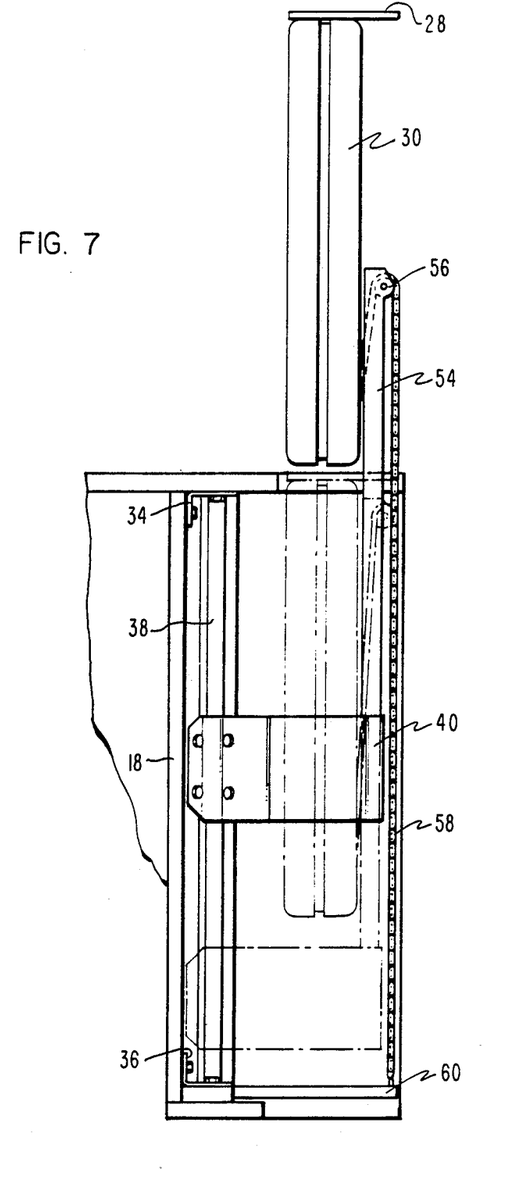
FIG. 7 is a side elevation view similar to FIG. 6 with the VDT screen in its use position.

As illustrated in hidden lines in FIGS. 5 and 6 a pneumatic damping device 74 can be associated with the lift mechanism to assist in the lowering of the VDT screen to its stored position if desired.

As will be apparent from the foregoing the stow away visual display terminal of this invention can provide the executive or manager with a computer display terminal free desk thus increasing the work space available for daily tasks when the visual display terminal of this invention is in its stored position but provide quick access to the computer visual display when it is needed.

I claim:

1. A stow away visual display terminal in combination with a work surface, said combination comprising:
   a work surface,
   means for supporting said work surface at a predetermined working level,
   a visual display terminal including a screen portion,
   lift means supporting said visual display terminal, said lift means including track means secured to said means for supporting said work surface, carriage means interconnecting said track means and said visual display terminal for supporting said visual display terminal on said lift means, extensible glide means interconnecting said visual display terminal and said carriage means for relative movement therebetween and a motion doubling direct chain drive linking said track means and said visual display terminal directly whereby for every increment of movement of said carriage means said visual display terminal moves two increments of movement, said drive means associated with said carriage means for moving said visual display terminal from its stored position to its visible position.

2. The combination according to claim 1 wherein said visual display terminal is a flat screen VDT.

3. The combination according to claim 1 wherein said work surface has a particular surface finish and cover means overlie the top of said visual display terminal, said cover means having the same surface finish as said work surface.

4. The combination according to claim 1 wherein a magnetic limit switch is mounted on said carriage means and spaced magnetic means are mounted on said track means for limiting the range of travel of said carriage means on said track means.

5. In combination with a desk or the like a computer visual display terminal adapted to be concealed from view in its stored position and movable to a viewable position when in use, said combination comprising:

a planar work surface for use in an office environment, work surface support means for supporting said work surface at a normal work surface height, a computer visual display terminal, lift means, including a frame and a movable carriage on said frame, extensible glide means interconnecting said visual display terminal and said carriage for relative movement therebetween and a motion doubling direct chain drive linking said frame and said visual display terminal directly whereby every increment of movement of said carriage imparts two increments of movement to said visual display terminal, said lift means operable to move said visual display terminal from a stored position beneath said work surface to a visual position above said work surface and return said visual display terminal to its stored position.

6. The combination according to claim 5 wherein said visual display terminal is a flat screen VDT.

7. The combination according to claim 5 wherein said work surface has a particular surface finish and said visual display terminal has an upper surface having the same surface finish as said work surface.

8. The combination according to claim 7 wherein said work surface has a cut-out portion therethrough and said upper surface of said visual display terminal fills said cut-out portion of said work surface when said visual display terminal is in its stored position.

9. The combination according to claim 5 wherein a magnetic limit switch is mounted on said carriage adjacent said frame and spaced magnetic means are mounted on said frame for limiting the range of travel of said carriage on said frame.

* * * * *